Patented Jan. 27, 1948

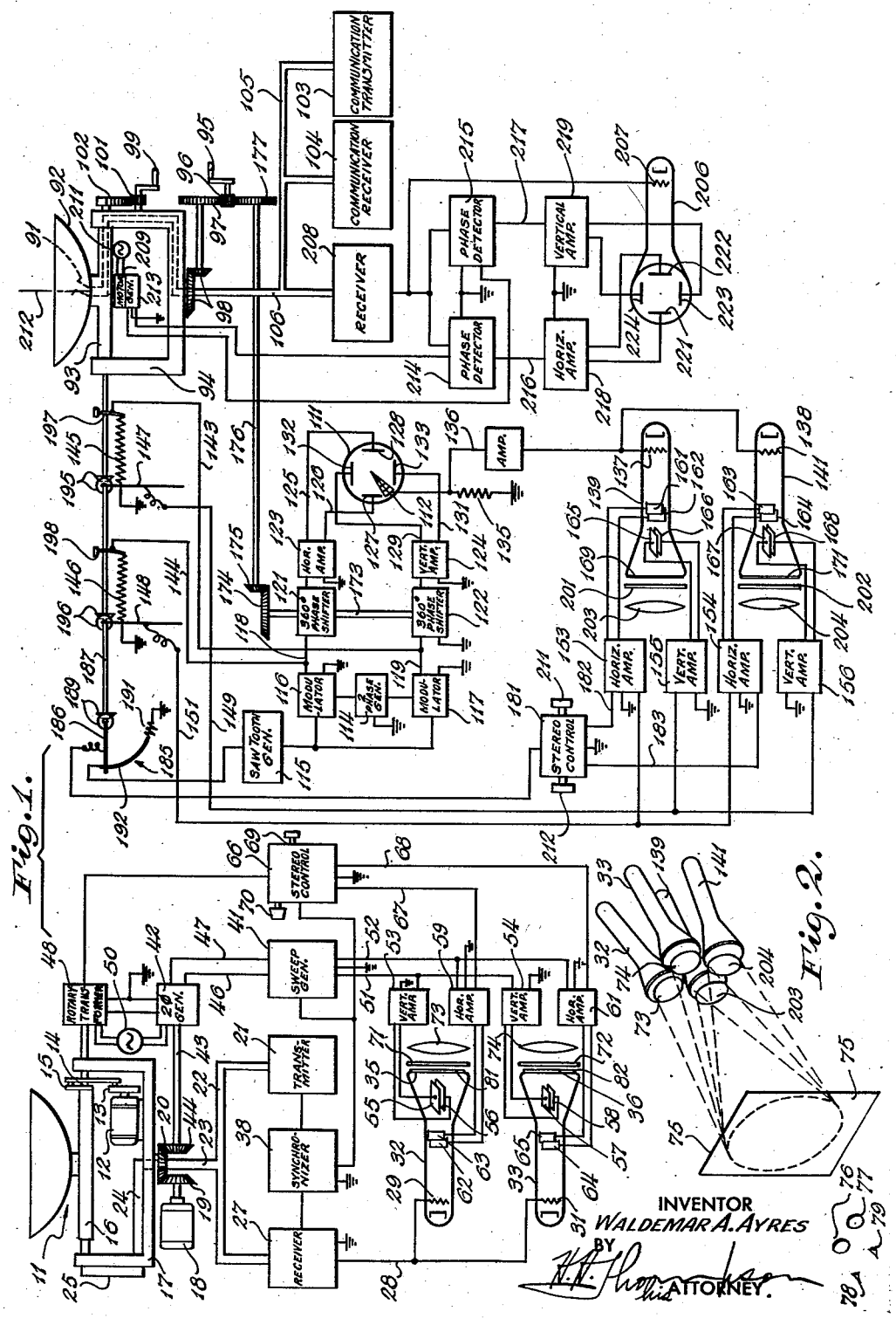

2,434,897

UNITED STATES PATENT OFFICE 2,434,897

STEREOSCOPIC RADIO LOCATION DEVICE

Waldemar A. Ayres, Kew Gardens Hills, N. Y., assignor to Sperry Gyroscope Company, Inc., a corporation of New York Application October 8, 1943, Serial No. 505,472

22 Claims. (Cl. 250—1.62)

This invention relates generally to stereoscopic apparatus, and particularly concerns stereoscopic apparatus for directing an instrument toward a selected object.

Stereoscopic apparatus has heretofore been devised for providing stereoscopic representations of objects in a selected portion of space. The present invention is useful in connection with such apparatus by providing a stereoscopic representation of a directional characteristic of an instrument. According to this invention, the stereoscopic representations of the objects and the directional characteristic of the instrument may be combined to show, stereoscopically, the position of the directional characteristic relative to the positions of the objects. In this manner a three-dimensional picture is formed in the brain of the observer which enables him to maneuver the instrument to direct it toward a selected object.

The invention is particularly useful in an air traffic control system. For example, a three dimensional stereoscopic picture of the aircraft within the area surrounding an airport may be produced by a radio locator and appropriate display device. In addition a stereoscopic representation of a communication beam may be combined with representations of the aircraft enabling an operator to direct the communication beam toward a selected one of the aircraft to give specific instructions to that craft. However, air traffic control is but one application of the invention. As will become apparent, it is also useful in directing all types of instruments toward an object for any purpose.

It is therefore a major object of the invention to provide stereoscopic apparatus for directing an instrument toward a selected object.

Another object of the invention is to provide stereoscopic apparatus for showing the position of a directional characteristic of an instrument relative to objects in a selected area or portion of space.

A further object of the invention is to produce a stereoscopic representation of a directional characteristic of an instrument.

A further object of the invention is to produce stereoscopic representations of objects and the directional characteristic of an instrument, and combine these representations to form a composite stereoscopic representation of the position of the directional characteristic relative to the position of the object.

A further object of the invention is to produce and combine stereoscopic representations of objects over a selected area, an outline or image of the area, and a directional characteristic of an instrument.

A further object of the invention is to provide apparatus for directing a communication instrument toward a selected object by providing stereoscopic representations of the objects and a directional characteristic of the instrument.

A further object of the invention is to provide apparatus for directing a communication radio beam toward a selected aircraft.

A still further object of the invention is to provide apparatus for directing an instrument toward a selected object by combining stereoscopic representations of objects over a selected area and of a directional characteristic of the instrument, and also including an indicator for showing the displacement of the directional characteristic from a selected object.

Other objects and advantages of the invention will become apparent from the following specification taken in connection with the accompanying drawings, wherein:

Fig. 1 is a schematic diagram of stereoscopic apparatus embodying the invention, and Fig. 2 is a perspective view showing a preferred arrangement of the elements forming a display device and shown diagrammatically in Fig. 1.

The specific embodiment of the invention shown in Fig. 1 has a radio locator for producing stereoscopic representations of the goniometric position of aircraft or other objects within a selected portion of space and a picture generator for producing stereoscopic representations of the goniometric position of a communication beam pattern as defined by a directional communication antenna. In both cases, the stereoscopic effect is attained by displacing the representation according to the distance of various objects or portions of the communication beam above the ground.

The representation of the objects and the communication beam pattern appear on a fluorescent screen of cathode ray tubes in a display device. If desired, stereoscopic representations of an image, map, or outline of the ground area may be combined with the other representations in the display device.

One locator suitable for producing stereoscopic representations of aircraft or other objects in a selected portion of space is shown diagrammatically in Fig. 1. This locator consists of a directional scanning radiator 11 that is scanned over a selected portion of space in any suitable manner. The particular form of scanner shown in the drawing is slowly oscillated in elevation about a horizontal axis by a motor 12 that drives through an eccentric 13, link 14, and lever 15 to oscillate shaft 16 that supports the antenna 11. Shaft 16 is journalled in a bracket 17 that is rotated at a comparatively rapid rate by a motor 18 which drives through gear 19 to rotate gear 20 on the bracket 17 in azimuth about a vertical axis.

The oscillating and rotating motions produced by these motors 12 and 18 cause the beam pattern of the radiator 11 to spirally scan a selected portion of space. The radiator 11 is supplied with high frequency radio energy from a transmitter 21 which is modulated by pulses of relatively short duration. The transmitter is connected through wave guides 22 and 23 to the scanner, which includes wave guides 24 and 25 together with the necessary rotating joints and couplings to permit scanning movements of the radiator 11 without disturbing the supply of radio energy thereto.

Energy reflected by objects within the portion of space scanned is collected by the antenna 11 and supplied through the wave guides to a receiver 27. The output of the receiver 27 is connected by lead 28 to intensity control grids 29 and 31 of a pair of cathode ray tubes 32 and 33 which are elements of the display device which is viewed by the observer. The grids 29 and 31 are normally biased to cut off the electron flow in the tubes 32 and 33, but permit passage of the beam upon the reception of radiant energy by the antenna 11. The electron beams of tubes 32 and 33 are scanned over their respective screens 35 and 36 in a manner to be described, whereby the traces produced when grids 29 and 31 permit passage of the electron beams correspond to the goniometric position of objects reflecting energy to the antenna 11.

Pulse modulation of the transmitter 21 is controlled by a synchronizer 38. The frequency of the synchronizer 38 determines the repetition rate of the transmitted pulses. The synchronizer 38 also may be connected to the receiver 27 in a manner rendering the receiver sensitive only during periods within which pulses of reflected energy are desired to be received by the antenna 11.

The electron beams of the two cathode ray tubes 32 and 33 are deflected identically by sawtooth voltages applied to the deflecting plates by a sweep generator 41 at a rate corresponding to the frequency of the synchronizer 38. These sawtooth voltages are adjusted to cause the electron beams to sweep radially from the center of the screens of the tubes in a direction corresponding to an orthogonal projection of the antenna beam pattern to a horizontal plane at any instant.

The amplitudes of the sweeping voltages are further modified in accordance with the angular position of the antenna relative to a horizontal plane. In this manner the length of each radial sweep corresponds to the orthogonal projection of a beam pattern of finite length. The time of each radial sweep is controlled by the synchronizer 38 according to the repetition rate of transmitted pulses. Thus, the time is constant regardless of the length of the sweep. Therefore, the electron beams move more slowly during short sweeps than during longer ones.

Voltages displaced by 90 degrees for rotating the electron beams in accordance with rotation of the antenna about the vertical axis 19 are produced by a two-phase generator 42 having two-phase windings displaced by 90 degrees. The rotor of this generator is rotated in accordance with the azimuth spinning movements of the antenna 11 about a vertical axis by a shaft 43 that is driven by a gear 44 meshing with the gear 20. In order to determine the distance that the electron beams move during each radial sweep, the amplitudes of these two-phase voltages are varied according to the oscillating movements of the antenna in elevation.

This is accomplished by varying the field strength of the generator 42 which is determined by the voltage output of a rotary transformer 48 driven by the shaft 16 according to the oscillations of the antenna 11. The rotary transformer is energized from a suitable constant source 50 of alternating current. The output voltage of the rotary transformer 48 varies sinusoidally according to the elevation angle of the antenna 11. This varying voltage is applied to the field winding of the two-phase generator 42.

The output voltages of the two-phase generator 42 depend upon the product of the voltages induced by the voltage applied to the field winding and the voltage generated by rotation of the generator rotor in the magnetic field. As is well known, the multiplication of two sine wave voltages produces voltages having frequencies equal to the sum and difference of the frequencies of the two sine waves. These two sum and difference frequencies correspond to two side bands without a carrier.

In the present case, the multiplication of the induced and generated voltages in the two-phase windings results in voltages having sum and difference frequencies. However, the amplitudes of these voltages (the amplitude of the side bands) are varied in accordance with the elevation angle of the antenna. A suitable carrier may be inserted at this point by connecting the source 50 of alternating current voltage to the two-phase generator 42.

The output voltages of the two-phase generator 42 may be represented as a carrier modulated at the azimuth spin frequency and varied in amplitude according to the elevation angle. These voltages are similar, but are displaced by 90° and are supplied as by leads 46 and 47 to sweep generator 41 where they are rectified. The envelopes of the rectified voltages are used to control the amplitudes of saw-tooth sweep voltages that are developed by the sweep generator 41 at a frequency determined by the synchronizer 38 to produce saw-tooth voltage waves at a frequency corresponding to the frequency of the transmitted pulses. This saw-tooth sweep voltage generator 41 is of such design that it may have either positive or negative voltage outputs depending upon the polarity of the control voltages. Furthermore, the amplitudes of the saw-tooth voltages are varied in accordance with the magnitude of the control voltages.

One output voltage of the sweep generator 41 is supplied by the lead 51 to vertical amplifiers 53 and 54 which are connected to vertical deflecting electrodes 55, 56, 57 and 58 of the tubes 32 and 33, respectively. The other output voltage is connected by lead 52 to horizontal amplifiers 59 and 61 which are connected to horizontal deflecting plates 62, 63, 64 and 65 of the tubes 32 and 33, respectively.

In this manner, the saw-tooth voltages act through the vertical and horizontal amplifiers to synchronously scan electron beams of the tubes 32 and 33 radially, synchronously with the transmission of pulses by the antenna 11. The direction of these radial sweeps is determined and continuously varied according to the angular position of the antenna 11 about a vertical axis. The length of each radial sweep is determined by the rotary transformer 48 according to the slowly oscillating movements of the antenna 11 about a horizontal axis.

Since the sweeps begin synchronously with the transmission of radiant energy pulses, their position at the time reflected pulses are received by the antenna correspond to the range of objects reflecting these pulses, as the range may be measured by measuring the time between transmitted and received pulses.

A stereoscopic control 66 produces saw-tooth voltages on leads 67 and 68 which are of opposite polarity and balanced with respect to ground. The frequency of these saw-tooth voltages is also determined by the frequency of the synchronizer 38. The amplitude of the voltages is determined by the elevation angle of the antenna 11. This is accomplished by controlling the amplitude of the stereoscopic saw-tooth voltages by the output of a second winding of the rotary transformer in accordance with the sine of the elevation angle of the antenna 11.

The leads 67 and 68 are connected to horizontal amplifiers 59 and 61 and act to shift the cathode ray beams of the tubes 32 and 33 horizontally in opposite directions in accordance with the amplitude of the stereoscopic saw-tooth voltages. Since these voltages are produced synchronously with the transmission of radiated pulses, the electron beams in tubes 32 and 33 are continuously shifted horizontally after the radiation of each pulse so traces produced by the reception of reflected energy are stereoscopically displaced in accordance with the distance of the objects relative to a reference plane or the ground.

The stereoscopic control 66 may include a balanced amplifier having variable controls actuated by knobs 69 and 70 to vary the direct current level and the amplification factor. Since the normal displacement between the representations on tubes 32 and 33 is determined by the direct current level of the leads 67 and 68, knob 69 may be adjusted to vary the normal displacement of objects at ground level, that is, at the level of the reference plane. Adjustment of the amplification of the saw-tooth voltage by turning knob 70 controls the amplitude of the stereoscopic displacement. This amplitude is a scale factor which determines the contrast for objects of different heights and may be varied according to the devices of individual apparatus.

A displacement of the electron beams based solely upon the time interval of transmitted and received pulses would displace the stereoscopic representation of the objects according to their range from the antenna 11. However, since the amplitude of the saw-tooth voltages from the stereoscopic control 66 is governed by the position of the antenna 11 in elevation, the stereoscopic displacement corresponds to the range of the objects multiplied by the sine of the elevation angle which is, of course the altitude of the objects.

The radio locator thus produces stereoscopically displaced representations of the goniometric position of objects within the scanned area which appear on the screens 35 and 36 of the cathode ray tubes 32 and 33. The stereoscopic displacement corresponds to the altitude of the objects, that is, the distance from a reference plane, whereupon an observer sees a three-dimensional picture by viewing the representations separately with his individual eyes.

In order to enable the observer to view these stereoscopic representations independently, polarizing screens 71 and 72 are positioned in front of the screens 35 and 36 and arranged to polarize the light therefrom in different directions. The polarized representations may, if desired, be focused by lenses 73 and 74 to combine the representations. By using projection type cathode ray tubes the stereoscopic representations may be focused on a screen such as that shown at 75 in Fig. 2. As shown in this figure, tubes 32 and 33 are arranged so the representations on their respective screens are superimposed by the lenses 73 and 74 on the screen 75. The effect of polarizing screens 71 and 72 enable the observer, by viewing the screen 75 through polarized discs 76 and 77, to view the stereoscopic representations independently with his eyes 78 and 79.

If desired, transparent films 81 and 82 containing stereoscopic images, maps or outlines of the ground area over which the objects are located may be placed over the screens 35 and 36. By adjusting the sensitivity of the tubes 32 and 33, sufficient background light may be projected through the films 81 and 82 to produce stereoscopic representations of the ground area on the screen 75. These representations of the ground area are thus superimposed upon representations of the objects and the two pairs of representations are combined in a manner such that the observer may view one of each of said pairs of representations separately with his individual eyes.

The locator described, may be of any type to produce the desired stereoscopic representations. In the apparatus shown and described herein, a hemispherical portion of space having its base on the ground is scanned. Obviously, the radio locator may scan any selected portion of space and have any reference plane as a base, without departing from the invention.

For a more detailed description of suitable apparatus for producing stereoscopic images of objects over a selected ground area, reference may be had to copending application Serial No. 498,606 for Stereoscopic image producing apparatus, filed in the names of W. A. Ayres and E. C. Streeter, Jr.

The present invention concerns primarily the provision of a stereoscopic representation which may be combined with the stereoscopic representation of an object to direct an instrument toward a selected object. The embodiment of the invention illustrated and described in this application concerns the direction of a communication beam toward a selected aircraft or other object over a predetermined portion of space.

However, it will be apparent that the apparatus could be used to produce a stereoscopic representation of a directional characteristic of any instrument and this stereoscopic representation employed to direct the instrument toward a selected object. Examples of other instruments which could be directed in this manner are other types of directional antennae or radiators, searchlights, and telescopes.

As shown diagrammatically in Fig. 1, a directional communication beam antenna 91 having a parabolic reflector 92 is carried on a shaft 93 journaled in a bracket 94 that may be positioned in azimuth by rotation about a vertical axis. The antenna may be rotated in azimuth as by a hand crank 95 that rotates a pinion 96 meshing with a gear 97 to drive through gearing 98, which rotates the bracket 94. The elevation position of the antenna 91 is likewise adjustable as by hand crank 99 which drives through a pinion 101 meshing with a sector 102 on the shaft 93. A suitable communication transmitter 103 and receiver 104 are connected to the antenna 91 through wave guides 105 and 106 for the transmission and reception of radio energy.

Since it is desired to provide a stereoscopic representation of the position of the communication beam pattern of the antenna 91 relative to the stereoscopic representations of objects as produced by the radio locator heretofore described, it is first necessary to generate a picture representation of the communication beam. For this purpose a picture generator tube 111, the design of which is known to those skilled in the art and conforms generally to conventional cathode ray tubes, has a target 112 adapted to be scanned by an electron beam.

The three-dimensional effect produced by stereoscopic representations depends upon the displacement of corresponding portions in two pictures. It has been found that a desirable picture for a directional characteristic of an instrument should have an outline corresponding to the outline of the characteristic but include suitable indicia, such as the cross-hatching shown on the target 112, to provide reference points on the picture which may be used by the observer in viewing the stereoscopic representations to produce a three-dimensional picture. The lines of the target 112 are preferably formed of insulating material, whereas the unmarked portions are of conducting material.

The cathode ray beam of the tube 111 is spirally scanned over the target by two phase voltages from a generator 114, the amplitude of which is controlled by a saw-tooth generator 115. One phase of the generator 114 is connected to a modulator 116 where it is combined with the output of the saw-tooth generator 115. A similar modulator 117 is connected to the other phase of the generator 114 and also combines the generated voltage with the saw-tooth output to produce a voltage varying in amplitude in accordance with the output of the saw-tooth voltage generator 114. The voltages of modulators 116 and 117 are connected by leads 118 and 119 through 360° phase shifters 121 and 122 to horizontal and vertical amplifiers 123 and 124.

The horizontal amplifier is connected as by leads 125 and 126 to horizontal deflecting plates 127 and 128 of the tube 111. Similarly, the output of the vertical amplifier 124 is connected by leads 129 and 131 to vertical deflecting plates 132 and 133 of the tube 111. Since these voltages, applied to the horizontal and vertical plates of the tube are displaced by 90° and varied in amplitude according to the output of the saw-tooth generator 115, the electron beam of the tube 111 is spirally scanned over the face of the tube at a frequency determined by the saw-tooth generator 115. As the electron beam scans over conducting portions of the target 112, current flows through the tube which produces a voltage across resistor 135 corresponding to the picture formed by the target 112. This voltage is connected by lead 136 to intensity control grids 137 and 138 of cathode ray tubes 139 and 141 to control the electron beams of these tubes.

The outputs of the modulators 116 and 117 are also connected by leads 143 and 144 across specially designed potentiometers 145 and 146. A portion of this voltage as determined by the position of potentiometer sliders 147 and 148, is supplied by leads 149 and 151 to horizontal amplifiers 153 and 154 of the tubes 139 and 141 and also to vertical amplifiers 155 and 156 of the tubes 139 and 141. Horizontal amplifiers 153 and 154 are connected to horizontal deflecting plates 161, 162 and 163, 164 of the tubes 139 and 141, respectively. Likewise, the outputs of vertical amplifiers 155 and 156 are connected to vertical deflecting plates 165, 166 and 167, 168 of the tubes 139 and 141, respectively.

By this arrangement, the electron beams of the tubes 139 and 141 are scanned spirally synchronously with scanning of the electron beam of the tube 111, but the area of screens 169 and 171 of the tubes 139 and 141 which is scanned, varies according to the position of potentiometer sliders 147 and 148.

Since the control grids 137 and 138 of the display tubes 139 and 141 are controlled according to the output of the picture generator tube 111, representations appear on the screens 169 and 171 corresponding to the target 112 which, as has already been described, is a picture of the communication beam pattern, of the antenna 91. The size of these representations varies according to the areas of screens 169 and 171 which are scanned, as determined by the position of potentiometer sliders 147 and 148.

In order that the representations of the communication beam appearing on the screens 169 and 171 will correspond in direction to the azimuth direction of the antenna 91, a phase displacement is introduced between the synchronously scanning beams of the picture generating tube 111 and the display tubes 139 and 141 corresponding to the azimuth angular position of the antenna 91. This phase displacement is accomplished by adjusting phase shifters 121 and 122 in the circuit of the picture generating tube 111 according to movements of the antenna 91 in azimuth. For this purpose a shaft 173 is driven by gear 174 that is rotated by pinion 175 and shaft 176 which is in turn driven by gear 177 meshing with pinion 96.

As the operator adjusts crank 95 to position the antenna 91 in azimuth, phase shifters 121 and 122 adjust the phase relation of the spiral scanning voltages applied to the picture generating tube 111 according to the azimuth angular position of the antenna 91. Obviously, either the scanning beam of the picture generating tube 111 or scanning beams of the display tubes 139 and 141 may be shifted to produce the same result. It is only necessary that phase displacement be introduced corresponding to the azimuth angular position or displacement of the directional instrument.

The apparatus thus far described provides a pair of representations of the communication beam which appear on screens 169 and 171 of the cathode ray display tubes 139 and 141. The representations are positioned on the screens in accordance with the azimuth angular position of the antenna 91. It is now necessary to introduce stereoscopic displacement between the two representations of the directional characteristic in order to provide a three-dimensional picture for the observer.

The stereoscopic bias could be obtained by producing a voltage corresponding to the elevation angle of the antenna 91. Thus, by introducing displacement between the two representations corresponding to the distance of various portions of the beam pattern from the ground, appropriate stereoscopic representations would be obtained. However, in the embodiment of the invention shown in the drawing it is contemplated that the ground area over which the space is scanned would have a diameter considerably in excess of the maximum altitude. For example, the locator might be effective over an area having a radius of approximately 100 miles, whereas it would not be necessary to communicate with aircraft at altitudes in excess of 10 miles.

It will be apparent therefore that the representation of the communication beam must be capable of projecting a distance at low altitudes corresponding to the radius of the area over which the locator is effective. In the example set forth this would be 100 miles. On the other hand, when the communicating beam is directed upwardly, it is only necessary to represent that portion of it which extends to an altitude of 10 miles. Obviously the stereoscopic definition is improved if the scale ranges from only 0 to 10 miles rather than from 0 to 100 miles, which would be the altitude of a 100 mile beam pointing directly upward.

It is desirable therefore to limit the stereoscopic displacement to an amount corresponding to a maximum altitude over which the apparatus is to be effective. If this is done, it is desirable to foreshorten the communication beam so it terminates at a selected altitude, which preferably is the same as the maximum altitude. Thus, the representation of the communication beam should become shorter as the elevation angle increases.

In order to stereoscopically displace the representations of the directional characteristic appearing on the screens 169 and 171, a stereoscopic control 181 is actuated by the saw-tooth generator 115 to supply saw-tooth voltages of opposite polarity to the horizontal amplifiers 153 and 154. As the radius of the spiral scan of the tubes 139 and 141 changes, the beams are shifted horizontally an amount depending upon the amplitude of the stereoscopic control voltages supplied by leads 182 and 183 to the amplifiers 153 and 154.

Greater spacing of the representations are required to provide a three-dimensional picture at long ranges than at short ranges. The invention contemplates an arrangement for adjusting automatically the spacing of the representations, as the elevation angle is changed, the spacing increasing within predetermined limits as the elevation angle increases. When the antenna is at zero elevation, that is, when the communication beam is directed horizontally, the stereoscopic control voltages should be a minimum. To accomplish this, the output of the saw-tooth generator 115 which actuates the stereoscopic control 181 is applied across a potentiometer 185 having a slider 186 positioned by a shaft 187 on the shaft 93 of the antenna in accordance with the elevation angle of the antenna 91. The shaft 187 drives through gearing 189 to adjust the position of the slider 186. The maximum output of the saw-tooth generator 115 corresponds to the maximum stereoscopic displacement desired, which is determined by the maximum altitude at which the apparatus is to be effective.

Since the stereoscopic displacement is limited to a given altitude, the stereoscopic displacement voltages increase only during the first portion of movement of the communication beam in elevation. This is accomplished by having the windings 191 of potentiometer 185 arranged within the first portion of movement of the slider 186, and a solid conductor 192 adapted to engage the slider 186 during the remainder of its movement. As the communication beam is moved upward in elevation, the amplitude of the saw-tooth generator is varied according to the elevation angle. As the amplitude is increased, the various portions of the representations on the screens 169 and 171 are shifted horizontally according to the distance of corresponding portions of the communication beam pattern above the ground.

Potentiometer sliders 147 and 148 are also driven by shaft 187 through gearing 195 and 196 according to the elevation angle of the antenna 91. The sliders 147 and 148 are pivoted at one end of the linear windings 145 and 146 and are so arranged that the voltage of the sliders is decreased as the elevation angle increases. This arrangement provides a multiplier which multiplies the output of modulators 116 and 117 by the cosine of the elevation angle.

However, since it is not desired to foreshorten the representation of the communication beam until its end reaches the maximum altitude, the sliders 147 and 148 ride on solid conductors 197 and 198 during movement of the antenna at low elevation angles. As the elevation angle increases, the outputs of modulators 116 and 117 are multiplied by the cosine of the elevation angle, whereupon the amplitudes of voltages 147 and 148 which are supplied to the horizontal and vertical amplifiers of the display tubes 139 and 141 reduce the diameter of the spiral scanning movement of the electron beam in these tubes.

The beams continue to be scanned synchronously with the beam of the picture tube 111 but the area of the screens 169 and 171 scanned by the beams is reduced as a function of the cosine of the elevation angle. This shortens the representations of the beam pattern appearing on screens 169 and 171 as the elevation angle increases. However, the same time is required to produce the shorter representations as was required for the longer ones. Therefore, the stereoscopic control voltages from the stereoscopic control 181 horizontally displace the various portions of the representations being displaced horizontally according to the distance of corresponding portions above the ground.

From this description of the apparatus for producing stereoscopic representations of the directional characteristic of the instrument, it will be apparent that a pair of stereoscopic representations of the communication beam pattern are developed on the screens of display tubes 139 and 141. These representations are continuously positioned in accordance with the azimuth position of the antenna. As the antenna moves upwardly in elevation, various portions of the two representations are displaced horizontally in accordance with the distance of corresponding portions of the communication beam pattern from the ground. When the ends of the representations have been displaced in accordance with the maximum altitude at which the apparatus is to be effective, the stereoscopic displacement remains constant but the representations are foreshortened as the elevation angle increases. As the representations are foreshortened, the stereoscopic displacement of the ends continues to correspond to the maximum altitude, so when the antenna 91 is pointed directly upward and the representations of the directional characteristic are merely spots on the screens 169 and 171, these spots are displaced in accordance with the maximum altitude.

The stereoscopic control 181 has knobs 211 and 212 adapted to control the direct current voltage level and the amplification of the saw-tooth voltages supplied by leads 182 and 183 to the horizontal amplifier. The direct current voltage level may be adjusted by knob 211 to determine the normal displacement of the two representations on tubes 139 and 141 to place the origin of the beam representations at any desired altitude. Adjustment of knob 212 controls the amplitude of the saw-tooth voltage supplied to the horizontal deflecting plates which determines the depth contrast for different portions of the communication beam representations.

In order to enable the observer to independently view the stereoscopic representations of the communication beam pattern appearing on screens 169 and 171, polarizing screens 201 and 202 are positioned in front of the screens 169 and 171. Also, the stereoscopic representations may be focused as by lenses 203 and 204 at any desired point. By using projection type cathode ray tubes as shown in the drawing, and arranging them as shown in Fig. 2, the stereoscopic representations of the directional characteristic may be superimposed upon the representations of the objects and the ground area on screen 75. Thus, the stereoscopic representations of the objects over a selected area appear on the screen 75 and stereoscopic representations of the directional characteristic of antenna 91 are combined therewith in a manner such that an observer may separately view one of each of the pairs of representations with his individual eyes, hereupon the representations are fused in his brain to form a three-dimensional picture.

The three-dimensional picture will show the position of the communication beam relative to the various objects within the portion of space scanned by the locator. The operator may then adjust the antenna 91 in azimuth and elevation to direct the communication toward a selected one of the objects appearing on the screen 75. As the antenna is moved the stereoscopic representations of the beam are adjusted so the three-dimensional picture shows, at all times, the position of the communication beam and indicates when it is being directed at a selected object.

In order to accurately direct the communication beam toward a selected object, another indicator in the form of a cathode ray tube 206 may be employed. The intensity control grid 207 of cathode ray tube 206 is controlled by the output of a radio receiver 208 that is connected by wave guide 106 to the antenna 91. Antenna 91 is continuously rotated or spun by a motor 209 which is energized from a source 211, whereupon the beam pattern of the antenna generates a cone about spin axis 212. Energy radiated by the locator antenna 11 may be reflected by an object to antenna 91. As the antenna 91 spins and conically scans its beam pattern about the spin axis 212, the envelope of reflected energy supplied to the receiver 208 varies in accordance with the displacement of a selected object relative to the axis 212.

The phase and amplitude of the variations in this envelope may be compared with voltages from a two-phase generator 213 by azimuth and elevation phase detectors 214 and 215 to produce output voltages corresponding to the azimuth and elevation displacement of the axis 212 relative to the selected object.

These voltages may be supplied by leads 216 and 217 to horizontal and vertical amplifiers 218 and 219 which are connected to horizontal and vertical deflecting plates 221, 222, 223 and 224 of the tube 206, respectively. The voltage from phase detectors 214 and 215 will thus act through amplifiers 218 and 219 to displace the electron beam of the tube 206 an amount and in a direction corresponding to the amplitude and phase relation of the envelope of received energy. As the reception of reflected energy actuates grid 207 to permit passage of electrons a trace will appear on the screen of the tube 206 to indicate the displacement of the spin axis 212 of the antenna relative to a selected object.

If necessary, suitable compensation may be provided at the wave guides 105 and 106 to alternately connect the antenna 91 to the transmitter 103 and receivers 104 and 208.

As stated at the outset of this description, the specific embodiment of the invention shown in the drawing produces stereoscopic representations of a communication beam pattern of an antenna. However, it should be understood that the invention may be used to provide stereoscopic representations of the directional characteristic of any instrument. Furthermore, any geometric plane may be substituted for the ground plane as a reference from which to measure the distance for the proper stereoscopic bias.

The stereoscopic representation of the directional characteristic of an instrument according to this invention produced, may be combined with stereoscopic representations of objects over a selected area as well as with representations of the area. These combined representations form composite stereoscopic representations. One of each of the pairs of representations produced is polarized or otherwise arranged to be viewed separately by one of the eyes of an observer, while the other representation of each of said pairs is polarized or arranged to be viewed by the second eye of the observer.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Stereoscopic apparatus comprising a locator, a display device actuated by said locator for producing a stereoscopic representation of an object, an instrument having a directional characteristic, and means responsive to the position of said instrument for combining a stereoscopic representation of said directional characteristic with the stereoscopic representation of said object.

2. Stereoscopic apparatus comprising a locator for producing a stereoscopic representation of objects in a selected portion of space, an instrument having a directional characteristic, means responsive to the position of said instrument for producing a stereoscopic representation of said directional characteristic, and a display device actuated by said locator and said means for combining said stereoscopic representations to show the position of said directional characteristic relative to said objects.

3. Stereoscopic apparatus comprising a locator for producing a pair of stereoscopically displaced representations of an object, an instrument having a directional characteristic, means responsive to the position of said instrument for producing a pair of stereoscopically displaced representations of said directional characteristic, and a display device for combining said pairs of representations in a manner whereby one of each of said pairs may be viewed separately by the individual eyes of an observer.

4. Stereoscopic apparatus comprising a locator for producing a stereoscopic representation of an object over a selected area, means for producing a stereoscopic representation of said selected area, an instrument having a directional characteristic, means responsive to the position of said instrument for producing a stereoscopic representation of said directional characteristic, and a display device actuated by said locator and said means for combining said representations.

5. Stereoscopic apparatus comprising a locator, a display device actuated by said locator for producing stereoscopic representations of objects, a radiant energy collector having a directional characteristic, means responsive to the position of said collector for combining a stereoscopic representation of said directional characteristic with the representations of said objects, and an indicator responsive to the reception of radiant energy from an object and the position of said collector for indicating the displacement of said directional characteristic relative to a selected object.

6. Apparatus for producing a stereoscopic representation of a directional characteristic of an instrument comprising a display device for producing a pair of stereoscopic representations of said directional characteristic, and a stereoscopic control responsive to the angular position of said instrument for causing stereoscopic displacement of at least one of said representations.

7. Apparatus for producing a stereoscopic representation of a directional characteristic of an instrument comprising a display device for producing a pair of stereoscopic representations of said directional characteristic, a positioning device actuated by said instrument for adjusting the position of said representations according to the angular position of said instrument about one axis, and a stereoscopic control responsive to the angular position of said instrument about a second axis for causing stereoscopic displacement of at least one of said representations.

8. Apparatus for producing a stereoscopic representation of a directional characteristic of an instrument comprising a display device for producing a pair of stereoscopic representations of said directional characteristic, and means responsive to the angular position of said instrument relative to a reference plane for causing stereoscopic displacement of portions of said representations corresponding to the position of corresponding portions of said directional characteristic relative to said plane.

9. Apparatus for producing a stereoscopic representation of a directional characteristic of an instrument comprising a display device for producing a pair of stereoscopic representations of said directional characteristic, a stereoscopic control responsive to the angular position of said instrument for causing stereoscopic displacement of at least one of said representations, and means responsive to said angular position of said instrument for changing the length of said representations.

10. Apparatus for producing a stereoscopic representation of a directional characteristic of an instrument comprising a display device for producing a pair of stereoscopic representations of said directional characteristics, means responsive to the angular position of said instrument within one portion of its range of movement for causing stereoscopic displacement of at least one of said representations and means responsive to said angular position of said instrument within a second portion of its range of movement for changing the length of said representations.

11. Apparatus for producing a stereoscopic representation of a directional characteristic of an instrument comprising a display device for producing a pair of stereoscopic representations of said directional characteristic, a positioning device actuated by said instrument for adjusting the position of said representations according to the angular position of said instrument about one axis, a stereoscopic control responsive to angular position of said instrument about a second axis for causing stereoscopic displacement of at least one of said representations according to the position of said instrument about said second axis, and means responsive to the position of said instrument about said second axis for changing the length of said representations.

12. Apparatus for producing a stereoscopic representation of a directional characteristic of an instrument comprising a picture generator for generating signals corresponding to a representation of said directional characteristic, a display device connected to said generator for producing a pair of representations of said directional characteristic, and a stereoscopic control responsive to the angular position of said instrument for controlling said display device to stereoscopically displace said two representations.

13. Apparatus for producing a stereoscopic representation of a directional characteristic of an instrument comprising a picture generator for generating signals corresponding to a representation of said directional characteristic, a display device connected to said generator for producing a pair of representations of said directional characteristic, phase-shifting means responsive to the angular position of said instrument about a first axis for rotating said representations, and a stereoscopic control responsive to the angular position of said instrument about a second axis for controlling said display device to streoscopically displace said two representations.

14. Apparatus for producing a stereoscopic representation of a directional characteristic of an instrument comprising a picture generator for generating signals corresponding to a representation of said directional characteristic, a display device connected to said generator for producing a pair of representations of said directional characteristic, and means responsive to the angular position of said instrument for controlling said display device to adjust the length of said two representations.

15. Apparatus for producing a stereoscopic representation of a directional characteristic of an instrument comprising a picture generator for generating signals corresponding to a representation of said directional characteristic, a display device connected to said generator for producing a pair of representations of said directional characteristic, phase-shifting means responsive to the angular position of said instrument about a first axis for rotating said representations, and means responsive to the angular position of said instrument about a second axis for controlling said display device to adjust the length of said two representations.

16. Apparatus for producing a stereoscopic representation of a directional characteristic of an instrument comprising a picture generator for generating signals corresponding to a representation of said directional characteristic, a display device connected to said generator for producing a pair of representations of said directional characteristic, a stereoscopic control responsive to the angular position of said instrument for controlling said display device to stereoscopically displace said two representations, and means responsive to said angular position of said instrument for controlling said display device to adjust the length of said representations.

17. Apparatus for producing a stereoscopic representation of a directional characteristic of an instrument comprising a picture generator for generating signals corresponding to a representation of said directional characteristic, a display device connected to said generator for producing a pair of representations of said directional characteristic, phase-shifting means responsive to the angular position of said instrument about a first axis for rotating said representations, a stereoscopic control responsive to the angular position of said instrument about a second axis for controlling said display device to stereoscopically displace said two representations, and means responsive to the angular position of said instrument about said axis for controlling said display device to adjust the length of said representations.

18. Apparatus for producing a representation of the directional characteristic of an instrument comprising a picture of said directional characteristic, a display device, means for synchronously scanning said picture and said display device for producing a representation of said directional characteristic on said display device, and a phase shifter responsive to the angular position of said instrument for adjusting said means to control the phase displacement between the scanning of said picture and the scanning of said display device, thereby positioning said representation according to the angular position of said instrument.

19. Apparatus for producing a representation of the directional characteristic of an instrument comprising a picture generator tube for generating signals corresponding to a representation of said directional characteristic, a display tube, a synchronizer, means actuated by said synchronizer for synchronously scanning said tubes to cause said display tube to produce a representation of said directional characteristic, and a phase shifter responsive to the angular position of said instrument for controlling the angular position of the representation of said directional characteristic on said display tube according to the angular position of said instrument.

20. A method of directing an instrument toward an object, which comprises the steps of producing a stereoscopic representation of the location of the object, producing a stereoscopic representation of the location of the directional characteristic of the instrument, combining said representations to form a composite stereoscopic representation showing the position of said directional characteristic relative to said object, and manipulating said instrument to direct the representation of said directional characteristic toward the representation of said object.

21. A method of producing a stereoscopic representation of the directional characteristics of an instrument which comprises the steps of producing a pair of representations of said directional characteristics, stereoscopically displacing said representations according to the angular position of said instrument, and changing the length of said representations according to said angular position of said instrument.

22. A method of producing a stereoscopic representation of the directional characteristics of an instrument which comprises the steps of producing a pair of representations of said directional characteristics, stereoscopically displacing said representations according to the angular position of said instrument within one portion of its range of movement, and changing the length of said representations according to said angular position of said instrument within a second portion of its range and movement.

WALDEMAR A. AYRES.

REFERENCES CITED

The following references are of record in the file of this patent:

UNITED STATES PATENTS

| Number | Name | Date |
|---|---|---|
| 2,301,254 | Carnahan | Nov. 10, 1942 |
| 2,107,464 | Zworykin | Feb. 8, 1938 |
| 934,916 | Von Hofe | Sept. 21, 1909 |
| 1,514,948 | Barr et al. | Nov. 11, 1924 |
| 1,864,899 | French | June 28, 1932 |
| 1,987,765 | Wandersleb | Jan. 15, 1935 |